United States Patent [19]

Yamamoto et al.

[11] Patent Number: 5,065,641
[45] Date of Patent: Nov. 19, 1991

[54] SHIFT LEVER ARRANGEMENT FOR OPERATING AUTOMATIC POWER TRANSMISSION

[75] Inventors: Yoshimi Yamamoto; Keisuke Kino, both of Shizuoka, Japan

[73] Assignee: Fuji Kiko Company, Limited, Tokyo, Japan

[21] Appl. No.: 500,872

[22] Filed: Mar. 29, 1990

[30] Foreign Application Priority Data

Mar. 30, 1989 [JP] Japan .................. 1-37180[U]

[51] Int. Cl.$^5$ .................................... B60K 29/02
[52] U.S. Cl. ................... 74/473 SW; 74/475; 192/4 A
[58] Field of Search ......... 74/473 SW, 475, 483 K, 74/878; 192/4 A; 180/82 A; 70/245, 247, 248, 252

[56] References Cited

U.S. PATENT DOCUMENTS

| | | | |
|---|---|---|---|
| 3,246,535 | 4/1966 | Boman | 74/475 |
| 3,942,614 | 3/1976 | Thompson | 192/4 A |
| 4,096,930 | 6/1978 | Viscardi | 192/4 A |
| 4,187,935 | 2/1980 | O'Hern | 192/4 A |
| 4,474,085 | 10/1984 | De Vogelaere et al. | 74/475 X |
| 4,572,340 | 2/1986 | Pierce | 192/4 A X |
| 4,660,443 | 4/1987 | Simancik | 74/475 X |
| 4,821,605 | 4/1989 | Dzioba | 74/475 X |
| 4,905,802 | 3/1990 | Gotoh | 192/4 A |
| 4,934,209 | 6/1990 | DeWitt et al. | 74/473 SW |
| 4,936,431 | 6/1990 | Shinpo | 74/473 SW X |
| 4,938,042 | 7/1990 | Muramatsu | 192/4 A X |
| 4,955,935 | 9/1990 | Katayama | 74/473 SW |

FOREIGN PATENT DOCUMENTS 945329 11/1948 France .

Primary Examiner—Gary L. Smith
Assistant Examiner—Suzanne L. Dino
Attorney, Agent, or Firm—Ronald P. Kananen

[57] ABSTRACT

A column-shift type, shift lever arrangement for operating an automatic power transmission includes a shift locking mechanism which prevents a vehicle's driver from changing the position of a transmission shift lever. The shift locking mechanism engages a annular groove formed in a compression rod at a location neighboring one end thereof so as to mechanically lock the movement of the shift lever arrangement, until the vehicular driver depresses a brake pedal once, after engine starting is performed when the shift lever arrangement is positioned in a parking-range position.

9 Claims, 4 Drawing Sheets

SHIFT LEVER ARRANGEMENT FOR OPERATING AUTOMATIC POWER TRANSMISSION

BACKGROUND OF THE INVENTION

1. Field of The Invention

The present invention relates generally to an operating arrangement for an automatic power transmission. More specifically, the invention relates to a column-shift type, shift lever arrangement for operating an automatic power transmission.

2. Description of The Background Art

Several column-shift type, shift lever arrangements for operating automatic power transmissions have been proposed.

In conventional column-shift lever arrangements, when a selector of the shift lever arrangement is positioned in either the parking range (P-range) position or the neutral position (N-position), the driver can perform engine starting. In addition, since there is no relationship between the operation of the shift lever arrangement and the application of the brake, so-called creep phenomenon is produced, i.e. the automotive vehicle advances if the driver does not depress the brake pedal when he/she shifts the selector of the shift lever arrangement to a position other than the P-range position after engine start. Therefore, in order to achieve a higher degree of vehicle safety, it is preferable that the shift lever arrangement be locked so that it is not possible to shift the lever position from the P-range after starting, if the brake pedal is not depressed.

SUMMARY OF THE INVENTION

It is therefore a principal object of the present invention to provide a shift lever arrangement for operating an automatic power transmission, which can achieve a high degree of safety in automotive vehicle operation.

It is another object of the invention to provide a shift lever arrangement for operating an automatic power transmission, which can establish a shift-lever locking condition in which the driver cannot change the position of the shift lever arrangement, if the driver does not depress the brake pedal at least once after starting the engine in the P-range of the transmission.

It is another object of the invention to provide a shift lever arrangement for operating an automatic power transmission, which can establish a shift-lever locking condition in a mechanical way.

It is a further object of the invention to provide a column-shift type, shift lever arrangement for an automatic power transmission, which can establish a column shift-lever locking condition in a mechanical way.

In order to accomplish the aforementioned and other objects, a shift lever arrangement for operating an automatic power transmission for an automotive vehicle, according to the present invention, includes a shift locking mechanism which mechanically locks the movement of a shift lever until the driver treads on a brake pedal once after engine starting operation is performed in the P-range of the transmission.

According to one aspect of the present invention, a shift lever arrangement for operating an automatic power transmission, comprises:

a control tube arranged essentially parallel to a vehicular steering column and supported thereon so as to be rotatable around a longitudinal axis thereof;

a manually operable lever for causing the control tube to rotate via manual operation;

a shift lever selectively positionable at any one of a parking range position or other positions, depending upon rotation of the control tube, for operating the automatic power transmission;

a compression rod received in the control tube, the compression rod being movable in the direction of the longitudinal axis of the control tube between first and second positions by operating the manually operable lever;

first means for preventing the control tube from rotating when the compression rod is positioned at the first position, and for allowing the control tube to rotate when the compression rod is positioned at the second position;

second means, movable between an engaging position in which the second means engages the compression rod and a disengaging position in which the second means disengages from the compression rod, for preventing the compression rod from being positioned in the second position so as to prevent the control tube from rotating when the second means is positioned in the engaging position, and for allowing the compression rod to be positioned in the second position so as to allow the control tube to rotate when the second means is positioned in the disengaging position; and driving means for driving the second means in response to turning ON thereof, the driving means causing the second means to be positioned in the engaging position when the driving means is OFF while the shift lever is positioned in the parking range position, and to be positioned in the disengaging position either when the driving means is turned ON while the shift lever is positioned in the parking range position or when the shift lever is positioned in positions other than the parking position.

The compression rod preferably has a groove which is engageable with the second means. The second means may include a first pivotal member which is pivotably supported on the control tube, one end portion of the first pivotal member engaging the groove of the compression rod in the engaging position of the second means, and disengaging from the groove in the disengaging position thereof. The second means may further include a second pivotal member which is supported on the control tube so as to be pivotable between a locking position and a releasing position depending upon the rotation of the control tube, the second pivotal member engaging the first pivotal member to cause the latter to be positioned in the disengaging position when the shift lever is positioned in positions other than the parking position, and the second pivotal member disengaging from the first pivotal member to allow pivotal movement of the first pivotal member between the engaging and disengaging positions when the shift lever is positioned in the parking position.

The driving means may include a solenoid and a plunger engaging the first pivotal member, the solenoid causing the plunger to move in a longitudinal direction between a projected position in which the plunger causes the first pivotal member to engage the groove of the compression rod, and a drawn position in which the plunger causes the first pivotal member to disengage from the groove, the plunger being positioned in the projected position in response to turning OFF of the solenoid and positioned in the drawn position in response to turning ON of the solenoid. The solenoid may be turned ON when the vehicular driver depresses the vehicle brake pedal. The plunger may be biased toward the projected position so as to be positioned in the projected position when the solenoid is turned OFF.

The shift lever arrangement may further comprise third means for causing the second means to disengage from the compression rod in manual operation.

BRIEF DESCRIPTION OF THE DRAWINGS

The present invention will be understood more fully from the detailed description given herebelow and from the accompanying drawings of the preferred embodiment of the invention. However, the drawings are not intended to imply limitation of the invention to a specific embodiment, but are for explanation and understanding only.

In the drawings.

DESCRIPTION OF THE PREFERRED EMBODIMENT

Figure 1:
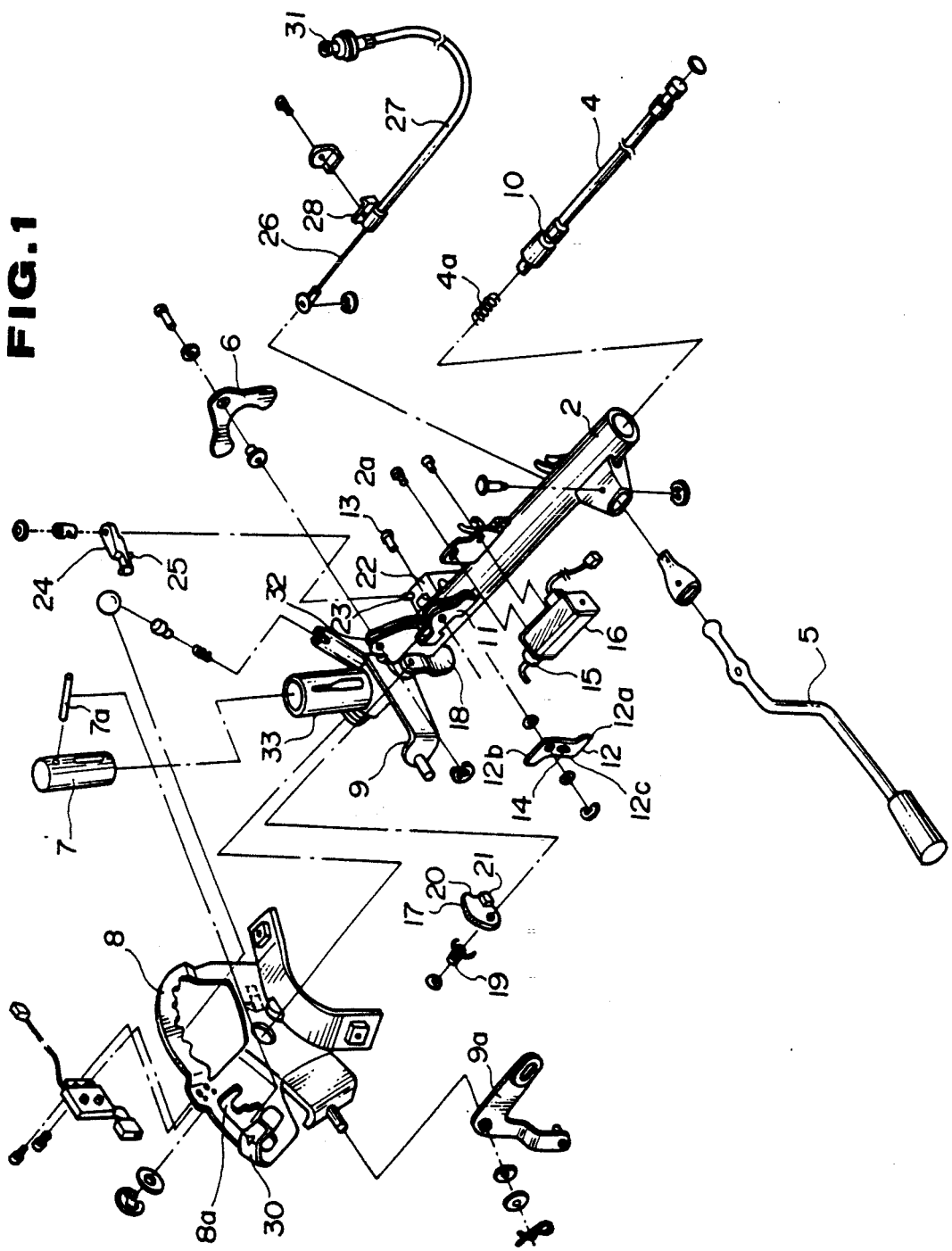
FIG. 1 is an exploded, perspective view of the preferred embodiment of a shift lever arrangement for an automatic power transmission, according to the present invention.
Figure 2:
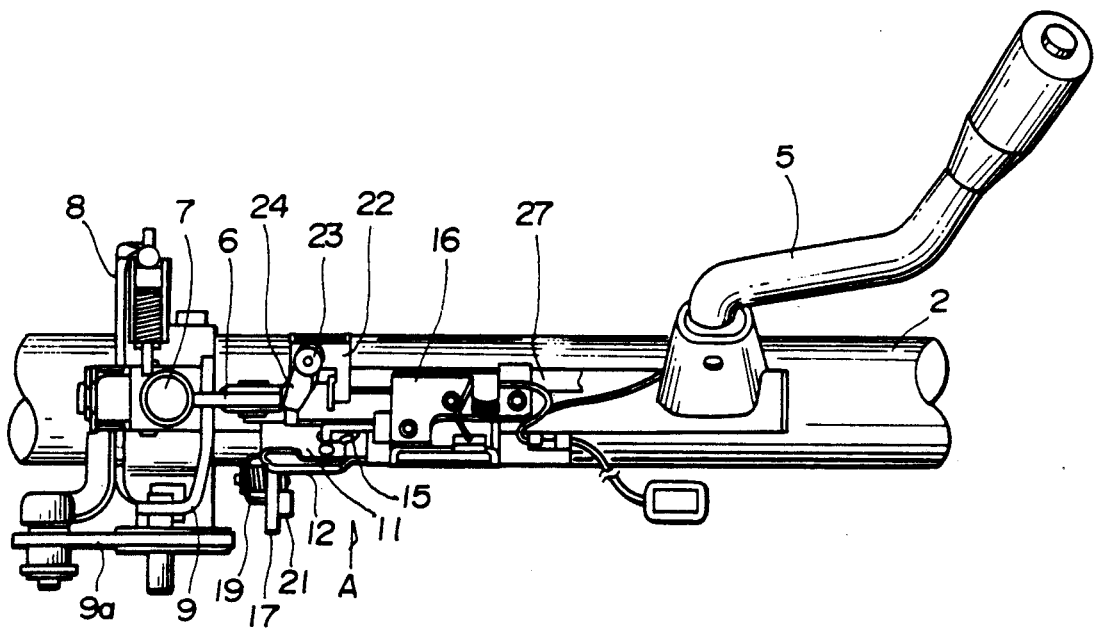
FIG. 2 is a plan view of the major part of the shift lever arrangement of FIG. 1.
Figure 4:
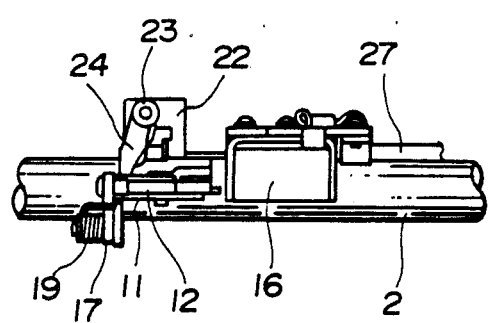
FIG. 4 is a plan view of the major part of the shift lever arrangement viewed from arrow B of FIG. 3.
Figure 3:
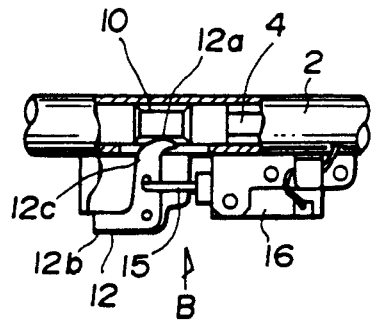
FIG. 3 is a plan view of the major part of the shift lever arrangement viewed from arrow A in FIG. 2.

Referring now to the drawings, particularly to FIGS. 1 to 4, a shift lever arrangement for operating an automatic power transmission for an automotive vehicle has an essentially cylindrical control tube 2 which extends parallel to a vehicular steering column (not shown). The control tube 2 is pivotably supported on the steering column via brackets (not shown). A compression rod 4 is received within the control tube 2 so as to be slidable in a longitudinal axis thereof. One end of the compression rod 4 engages a hand lever 5 so that the rod can be moved along its longitudinal axis depending upon the movement of the hand lever in a known manner. The compression rod 4 is biased by means of a return spring 4a in a direction of the engagement between the compression rod 4 and the hand lever 5. A selecting lever 6 is pivotably supported on the control tube 2, via a bracket 32, so as to be pivotable around its axis extending essentially perpendicular to the longitudinal axis of the control tube 2. The selecting lever 6 has two arms which extend essentially perpendicular to each other from the pivotal axis thereof. One of the arms of the selecting lever 6 passes through an elongated through opening (not shown) which is formed in the control tube 2 so as to extend in a direction of the longitudinal axis of the control tube 2, and engages the other end of the compression rod 4 so that the selecting lever 6 can pivot depending upon the longitudinal movement of the compression rod 4. The other arm of the selecting lever 6 engages an essentially cylindrical selector member 7. The selector member 7 is received in an essentially cylindrical member 33, which extends perpendicularly to the longitudinal axis of the control tube 2, so as to allow the selector member to be movable in a radial direction from the control tube 2 depending upon pivotal movement of the selecting lever 6. The selector member 7 has a positioning pin 7a which extends essentially perpendicular to the selector member 7.

A detent plate 8 is arranged at a location neighboring the selector member 7 and is fixed to the steering column. The detent plate 8 has a positioning groove 8a which is cut out of the detent plate 8 in a predetermined shape. The positioning pin 7a of the selecting member 7 engages the positioning groove 8a of the detent plate 8. When the selector member 7 is positioned in an extended position away from the control tube 2, the positioning pin 7a can move along the smooth edge of the positioning groove 8a by upon the pivotal movement of the control tube 2. On the other hand, when the selector member 7 is positioned in a retracted position close to the control tube 2, the positioning pin 7a is held in a fixed position. That is, when the driver operates the hand lever 5 so as to cause the compression rod 4 to move toward the selecting lever 6, the selecting lever 6 rotates so that the selector member 7 is positioned in the extended position. In this position, the driver can cause the control tube 2 to rotate by operating the hand lever 5 since, in this position, the positioning pin 7a can move along the smooth upper edge of the positioning groove 8a to allow the control tube to rotate. On the other hand, when the driver operates the hand lever 5 so as to cause the compression rod 4 to move toward the hand lever 5, the selecting lever 6 rotates reversely so that the selector member 7 is positioned in the retracted position. In this position, the driver cannot cause the control tube 2 to rotate by operating the hand lever 5, since the positioning pin 7a is positioned at the bottom of the positioning groove 8a which prevents the rotation of the control tube 2.

A shift lever 9 is connected to the control tube 2 at a location neighboring the detent plate 8. The shift lever 9 extends radially from the control tube 2, and can pivot depending upon the rotation of the control tube 2.

A lever 9a is pivotably supported on the detent plate 8. The lever 9a has two arms which extend essentially perpendicular to each other from the pivotal axis thereof. The end of one arm of the lever 9a engages the free end of the shift lever 9 so that the lever 9a pivots depending upon the pivotal movement of the shift lever 9. The end of another arm of the lever 9a is connected to a wire or rod (not shown) which controls a power transmission, so that the power transmission is controlled depending upon the pivotal movement of the lever 9a.

According to the present invention, an annular groove 10 is formed in the compression rod 4 at a location neighboring the end at which the compression rod 4 engages the selecting lever 6. As will be described hereinafter, a rocking member 12 is engageable with the annular groove 10.

The control tube 2 has an elongated through opening 2a which extends longitudinally at a position corresponding to the location of the annular groove 10 of the compression rod 4. A bracket 11 is fixed to the outer surface of the control tube 2 so as to surround the elongated through opening 2a. The bracket 11 oscillatably supports an essentially Z-shaped rocking member 12 by means of a shaft 13. One end portion 12a of the rocking member 12 is designed to be engageable with the annular groove 10.

A solenoid 16, serving as an electromagnetic driving source, is mounted on the control tube 2. The solenoid 16 receives a plunger 15 therein. The plunger 15 is biased so that a part thereof projects from the solenoid 16. The projecting portion of the plunger 15 is bent essentially perpendicular to the longitudinal axis of the solenoid 16. The end of the plunger 15 engages a slightly elongated through opening 14 formed in the rocking member 12 so that the longitudinal movement of the plunger 15 causes the rocking member 12 to oscillate.

A locking lever 17 is pivotably supported on the control tube 2 via a bracket 18. The locking lever 17 has a contact portion 20 and a stopping portion 21. The locking lever 17 is biased by means of a spring 19, one end of which is connected to the locking lever 17 and the other end of which is connected to the bracket 18, so that the stopping portion 21 prevents, the end portion 12b of the rocking member 12 from moving upwardly by the force of the spring 19 when the shift lever 9 for the automatic power transmission is positioned in other than the P-range (parking range). When the shift lever 9 is positioned in the P-range position, the contact portion 20 comes into contact with a stopper 30 fixed to the detent plate 8 so that the stopping portion 21 disengages from the end portion 12b of the rocking member 12 to allow the end portion 12b to move upwardly. Therefore, when the shift lever 9 is positioned in the P-range position while no electrical current passes through the solenoid 16, the end portion 12a of the rocking member 12 engages the annular groove 10 of the compression rod 4, thus locking the shift lever arrangement, as shown in FIG. 7.

Figure 5:
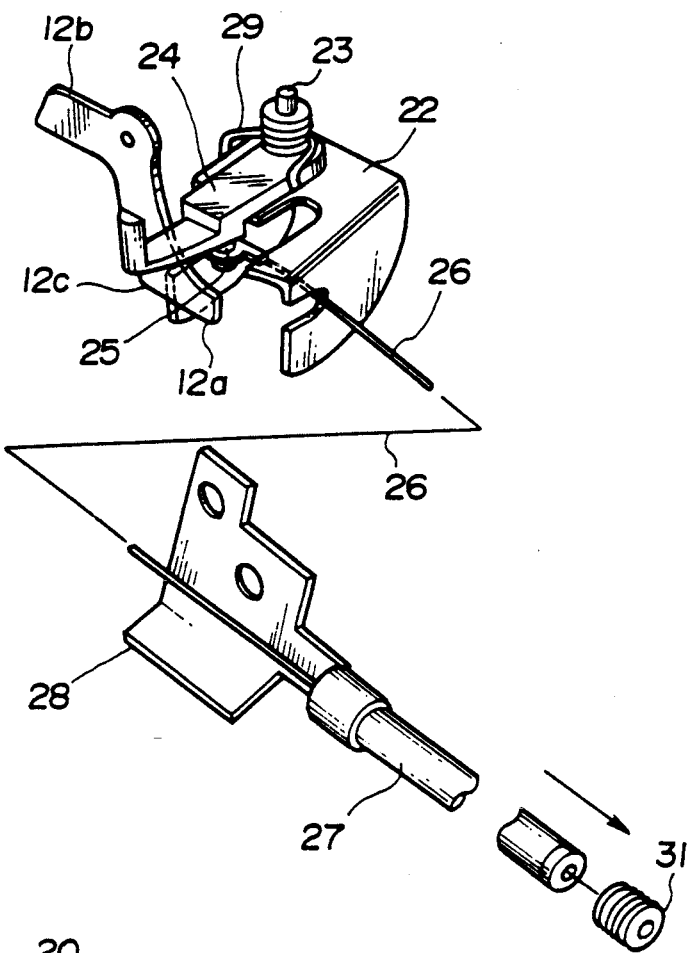
FIG. 5 is a perspective view of the major part of the shift lever arrangement of FIG. 1, which shows a manually operable shift-lock releasing mechanism.

Furthermore, a bracket 22 is secured to the outer surface of the control tube 2 at a location neighboring the rocking member 12. The bracket 22 has a pivotal axle 23 projecting upwardly, on which a release lever 24 is pivotably supported. The release lever 24 has a projecting portion 25 at a location neighboring the free end thereof. The projecting portion 25 is connected to one end portion of a release wire 26. As can be seen clearly from FIG. 5, the release lever 24 is so arranged perpendicular to the rocking plate 12, and is biased so as to come into contact with the rocking member 12 by means of a return spring 29. The release wire 26 passes through a tube 27 which is arranged along the outer surface of the control tube 2 to be secured thereto at a location neighboring the hand lever 5 by means of a bracket 28. The other end portion of the release wire 26 is connected to a manually operable thumb nut 31.

The operation of a shift lever arrangement for operating an automatic power transmission, according to the present invention, is described below.

Figure 7:
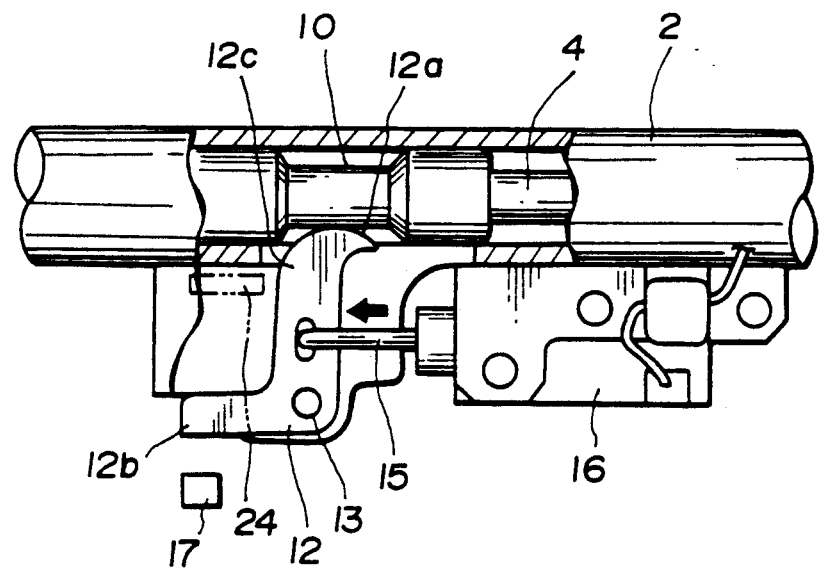
FIGS. 7 and 8 are partially sectional, plan views of the major part of the shift lever arrangement, which show the operation of the shift-lock releasing mechanism.

When the driver causes the hand lever 5 to rotate so as to be positioned in the P-range position, the control tube 2 rotates around the axis thereof, and the contact portion 20 of the locking lever 17 comes into contact with the stopper 30, and the locking lever 17 disengages from the end portion 12b of the rocking member 12 as shown in FIG. 7. In this condition, the oscillating movement of the rocking member 12 is unrestricted. Since the plunger 15 is positioned in its projected position when no electrical current passes through the solenoid 16, the end portion 12a of the rocking member 12 engages the annular groove 10 of the compression rod 4 via the elongated through opening 2a as shown in FIG. 7. Therefore, the compression rod 4 is prevented from moving in the longitudinal axis thereof in the control tube 2. As a result, the compression rod 4 cannot cause the selecting member 7 to be positioned in the extended position via the selecting lever 6, so that the shift lever 9 cannot be positioned in positions other than the P-range position. This condition will be hereinafter referred to as a "shift lock condition".

Figure 6:
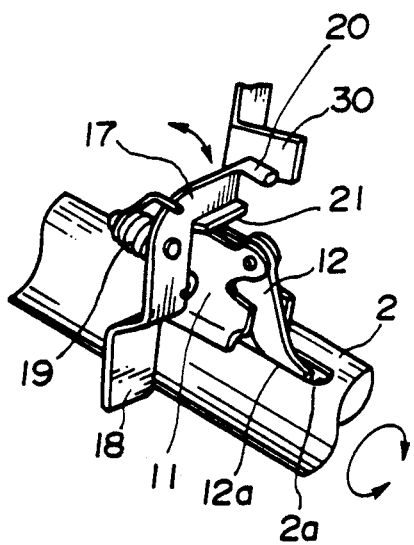
FIG. 6 is a perspective view of the major part of the shift lever arrangement of FIG. 1, which shows a shift-lock condition.
Figure 8:
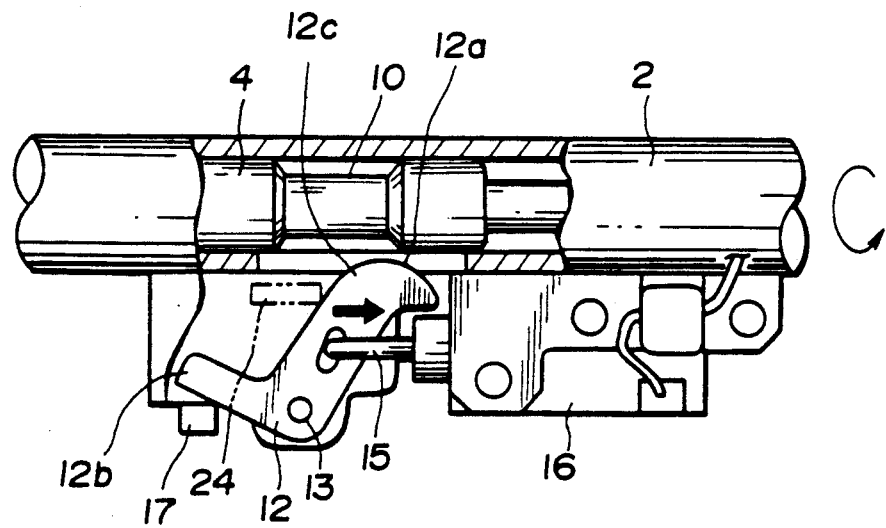

In this condition, when the driver performs engine starting and depresses the brake pedal, the solenoid 16 becomes active via this braking operation to cause the plunger 15 to be positioned in its drawn direction, so that the rocking member 12 rotates and the end portion thereof disengages from the annular groove 10 as shown in FIG. 8. In this condition, when the driver causes the hand lever 5 to rotate so as to shift any one of positions other than the P-range position, the control tube 2 rotates so that the contact portion 20 of the locking lever 17 disengages from the stopper 30. As a result, the locking lever 17 rotates by the force of the spring 19 so that the stopping portion 21 of the locking lever 17 prevents the end portion, 12b of the locking member 12 from moving upwardly as shown in FIG. 6. In this condition, the shift lock condition is maintained if no electrical current passes through the solenoid 16.

Furthermore, should the wiring, or the like, supplying electrical power to the solenoid 16 be broken or damaged while in the shift lock condition, the driver can release the shift lock condition via manual operation. That is, when the driver draws the thumb nut 31 so as to draw the release wire 26, the end portion 12c of the rocking member 12 is pushed by means of the release lever 24 as shown by the phantom line in FIGS. 7 and 8, so that the rocking member 12 rotates clockwise. In this way, the end portion 12a of the rocking member 12 can disengage from the annular groove 10 so as to release the shift lock condition.

As mentioned above, according to the present invention, if the driver does not depress the brake pedal to cause the solenoid to operate after he/she performs the engine starting operation in, the P-range position of the shift lever, then he/she cannot operate the shift lever in any position other than the P-range position, so that it is possible to prevent so-called creep phenomenon. In addition, according to the present invention, the shift lock condition in the P-range can be achieved when no electrical current passes through the solenoid, i.e. by the force of the spring by which the plunger of the solenoid is biased outwardly. Therefore, power consumption can be decreased, which is economical. Furthermore, since no heat is produced in the solenoid even if the shift lock condition continues for a long time, no heat damage will be incurred by proximate parts made of synthetic resin.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modification to the shown embodiments which can be embodied without departing from the principle of the invention as set out in the appended claims.

What is claimed is:

1. A shift lever arrangement for operating an automatic power transmission for an automotive vehicle having a brake capable of being actuated, said arrangement comprising:

a control tube arranged essentially parallel to a vehicular steering column and supported thereon so as to be rotatable around a longitudinal axis thereof;

a manually operable lever for causing said control tube to rotate via manual operation;

a shift lever selectively positioned in anyone of a parking range position or other positions, rotating with said control tube for operating the automatic power transmission;

a compression rod received in said control tube, said compression rod being movable in a direction along the longitudinal axis of said control tube between first and second positions by operating said manually operable lever;

first means for preventing said control tube from rotating when said compression rod is positioned in said first position, and for allowing said control tube to rotate when said compression rod is positioned in said second position;

second means, movable between an engaging position in which said second means engages said compression rod and a disengaging position in which said second means disengages from said compression rod, for preventing said compression rod from being positioned in said second position so as to prevent said control tube from rotating when said second means is positioned in the engaging position, and for allowing said compression rod to be positioned in said second position so as to allow said control tube to rotate when said second means is positioned in the disengaging position; and electromagnetic driving means for driving said second means in response to turning ON thereof, said electromagnetic driving means causing said second means to be positioned in said engaging position when the electromagnetic driving means is OFF, while said shift lever is positioned in said parking range position, and to be positioned in said disengaging position either when the electromagnetic driving means is turned ON, while said shift lever is positioned in said parking range position, or when said shift lever is positioned in positions other than said parking position.

2. A shift lever arrangement as set forth in claim 1, wherein said compression rod has a groove which is engageable with said second means.

3. A shift lever arrangement for operating an automatic power transmission for an automotive vehicle having a brake capable of being actuated, said arrangement comprising:

a control tube arranged essentially parallel to a vehicular steering column and supported thereon so as to be rotatable around a longitudinal axis thereof;

a manually operable lever for causing said control tube to rotate via manual operation;

a shift lever selectively positioned in any one of a parking range position or other positions, rotating with said control tube for operating the automatic power transmission;

a compression rod received in said control tube, said compression rod being movable in a direction along the longitudinal axis of said control tube between first and second positions by operating said manually operable lever;

first means for preventing said control tube from rotating when said compression rod is positioned in said first position, and for allowing said control tube to rotate when said compression rod is positioned in said second position;

second means, movable between an engaging position in which said second means engages said compression rod and a disengaging position in which said second means disengages from said compression rod, for preventing said compression rod from being positioned in said second position so as to prevent said control tube from rotating when said second means is positioned in the engaging position, and for allowing said compression rod to be positioned in said second position so as to allow said control tube to rotate when said second means is positioned in the disengaging position;

driving means responsive to brake actuation for driving said second means in response to turning ON thereof, said driving means causing said second means to be positioned in said engaging position when the driving means is OFF, while said shift lever is positioned in said parking range position, and to be positioned in said disengaging position either when the driving means is turned ON, while said shift lever is positioned in said parking range position, or when said shift lever is positioned in positions other than said parking position;

wherein said compression rod has a groove which is engageable with said second means; and wherein said second means includes a first pivotal member which is pivotably supported on said control tube, one end portion of the first pivotal member engaging said groove of the compression rod in said engaging position of the second means, and disengaging from said groove in said disengaging position thereof.

4. A shift lever arrangement as set forth in claim 3, wherein said second means further includes a second pivotal member which is supported on said control tube so as to be pivotable between a locking position and a releasing position depending upon the rotation of said control tube, said second pivotal member engaging said first pivotable member to cause the latter to be positioned in said disengaging position when said shift lever is positioned in positions other than said parking position, and said second pivotal member disengaging from said first pivotal member to allow the pivotal movement of said first pivotal member between said engaging and disengaging positions when said shift lever is positioned in said parking position.

5. A shift lever arrangement as set forth in claim 3, wherein said driving means includes a solenoid and a plunger engaging said first pivotal member, said solenoid causing the plunger to move in a longitudinal direction between a projected position in which said plunger causes said first pivotal member to engage said groove of the compression rod, and a drawn position in which said plunger causes said first pivotal member to disengage from said groove, said plunger being positioned in said projected position in response to turning OFF of said solenoid and positioned in said drawn position in response to turning ON of said solenoid.

6. A shift lever arrangement as set forth in claim 5, wherein said solenoid is turned ON when the vehicle driver depresses a brake pedal.

7. A shift lever arrangement as set forth in claim 5, wherein said plunger is biased toward said projected position so as to be positioned in the projected position when said solenoid is turned OFF.

8. A shift lever arrangement as set forth in claim 3, which further comprises third means for causing said second means to disengage said compression rod via manual operation.

9. A shift lever arrangement as set forth in claim 3, which further comprises third means for thrusting said first pivotal member so as to disengage from said groove of the compression rod in a manual operation.

* * * * *